(12) United States Patent
Chapman

(10) Patent No.: US 12,022,042 B1
(45) Date of Patent: Jun. 25, 2024

(54) CORRELATED THREE-LAYER MICROTEXT

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/198,796

(22) Filed: May 17, 2023

(51) Int. Cl.
*H04N 1/32* (2006.01)

(52) U.S. Cl.
CPC ..... *H04N 1/32352* (2013.01); *H04N 1/32336* (2013.01)

(58) Field of Classification Search
CPC .............. H04N 1/32352; H04N 1/32336
See application file for complete search history.

(56) References Cited

U.S. PATENT DOCUMENTS

| | | | |
|---|---|---|---|
| 9,148,546 B2 | 9/2015 | Miller et al. | |
| 9,614,995 B1 | 4/2017 | Chapman | |
| 9,781,294 B1 | 10/2017 | Chapman | |
| 10,009,503 B1* | 6/2018 | Chapman | H04N 1/32267 |
| 10,019,627 B2 | 7/2018 | Kutter et al. | |
| 10,593,006 B2 | 3/2020 | Holmes | |
| 2008/0298634 A1* | 12/2008 | Harada | H04N 1/32336 382/100 |
| 2009/0175493 A1* | 7/2009 | Yokoi | G06V 30/1478 382/172 |
| 2010/0150433 A1* | 6/2010 | Wang | H04N 1/00864 382/162 |
| 2010/0214595 A1* | 8/2010 | Chapman | H04N 1/32128 358/1.15 |
| 2016/0096393 A1* | 4/2016 | Chapman | H04N 1/32309 283/73 |
| 2019/0306367 A1* | 10/2019 | Chapman | G06V 30/1448 |

OTHER PUBLICATIONS

"Fraud-Resistant Effects That Protect Your Most Sensitive Documents," 2019 Xerox Corporation.
"Xerox® Specialty Imaging: Fraud Deterrent Technology," https://www.xerox.com/en-us/digital-printing/fraud-deterrent-technology, 2023 Xerox Corporation.
"Thriving in the Era of Digital Transformation," 2017 Xerox Corporation.
"XMPie® Variable Data Printing Solutions," https://www.xerox.com/en-bd/digital-printing/workflow/xmpie-variable-data-printing-solutions, 2023 Xerox Corporation.

* cited by examiner

*Primary Examiner* — Ted W Barnes
(74) *Attorney, Agent, or Firm* — Ortiz & Lopez, PLLC; Kermit D. Lopez; Luis M. Ortiz

(57) ABSTRACT

A method, apparatus and system for rendering a security mark, can involve providing two variable layers of data text for a security mark including a first variable layer and a second variable layer, and applying the security mark to a recording medium using the two variable layers to create a third variable layer of the security mark. The second variable layer can be applied out of phase or orthogonally from the first variable layer at the same frequency, which can form the third variable layer with data text that is decodable. The third variable layer with the data text can be decodable with a decoding screen. In addition, the first, second, and third variable layers can share the same area. The security mark may comprise a correlation mark.

20 Claims, 7 Drawing Sheets

CORRELATED THREE-LAYER MICROTEXT

TECHNICAL FIELD

Embodiments are related to image processing methods, systems and devices. Embodiments also relate to printing devices and techniques. Embodiments further relate to security devices such as watermarks including correlation marks.

BACKGROUND

In conventional printing processes that require security measures, a pattern color space having specialty imaging characteristics can be used to provide security measures and prevent counterfeiting of printed materials. Furthermore, in conventional printing processes, a pattern color space can be used, in part on variable data, such as printing logos, serial numbers, seat locations, or other types of unique identifying information on printed materials.

Security is an important requirement in many document production applications. In situations such as official or government document printing, event ticket printing, financial instrument printing and the like, many documents must be protected against copying, forging and/or counterfeiting. To accomplish this, printed documents often include security marks or security features that serve to prevent counterfeiting and/or identify a document as original.

In security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. An example document is a prescription where a pharmacist would like to be able to have a good level of confidence that the document is genuine.

A design goal of specialty imaging effects is to be unreadable under one condition and readable under another such as the correlation marks shown in FIG. 1 and FIG. 2. That is, FIG. 1 illustrates a pictorial view 10 of correlation marks 11 and 13 respectively located above barcodes 15 and 17, and without a decoding key. FIG. 2 illustrates a pictorial view 12 of the correlation mark 11 with a decoding key 19.

FIG. 3 illustrates other examples of specialty imaging effects that are difficult to read. That is, FIG. 3 illustrates pictorial views 16, 18, 20, 22 of images which demonstrate microtext with and without a loupe in accordance with an embodiment. Microtext is shown in pictorial view 20 but may only be viewed with magnification such as the loupes shown in pictorial views 16, 18, and 20. A loupe is a small magnification device that can be used to see small details more closely. Loupes generally have higher magnification than a magnifying glass and are designed to be held or worn close to the eye. Note that a microscope can also work in place of such loupes. Any device that allows for magnification such as a loupe, microscope, etc. can be used to review microtext.

Many security printing effects take up some real estate/space on the document they protect. This often conflicts, however, with the designer's intent of an atheistically pleasing design for documents such as concert tickets and coupons. It is therefore desirable to have multiple effects or layers sharing the same space.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide for improved printing devices and rendering techniques.

It is yet another aspect of the embodiments to provide for an improved security device such as a watermark used in securing documents.

It also an aspect of the embodiments to provide for a method, system and device for applying a security mark to a recording medium (e.g., a document) using two variable layers of microtext, which creates a third variable layer of microtext that is decodable with a decoding screen.

The aforementioned aspects and other objectives and advantages can now be achieved as described herein. In an embodiment, a method of rendering a security mark, can involve providing two variable layers of data text for a security mark including a first variable layer and a second variable layer, and applying the security mark to a recording medium using the two variable layers to create a third variable layer of the security mark, wherein the second variable layer can be applied out of phase or orthogonally from the first variable layer at a same frequency, which can form the third variable layer with data text that is decodable.

In an embodiment, the third variable layer with the data text can be decoded with a decoding screen.

In an embodiment, the first, second, and third variable layers can share the same area.

In an embodiment, the security mark can comprise a correlation mark.

In an embodiment, the security mark may be a watermark.

In an embodiment, the data text may comprise variable data text.

In an embodiment, a method of rendering a security mark, can include the following steps: a) defining a security mark with a frequency; b) creating a microfont with a period less than a fraction of the frequency; c) defining the security mark with an angle that is limited by the microfont; d) defining a first variable data string, a second variable data string, and a third variable data string; e) writing the first variable data string at the angle and the frequency using the microfont; and f) writing the second variable data string orthogonal to the angle and at the frequency using the microfont.

In an embodiment, as a result of steps a) through f), the third variable data string may not be decodable without a decoding screen.

In an embodiment, a security apparatus may include a security mark having two variable layers of data text including a first variable layer and a second variable layer; and a third variable layer of the security mark, wherein the security mark is applied to a recording medium using the two variable layers to create the third variable layer of the security mark, wherein the second variable layer can be applied out of phase or orthogonally from the first variable layer at a same frequency, which forms the third variable layer with data text that is decodable.

BRIEF DESCRIPTION OF THE DRAWINGS

The accompanying figures, in which like reference numerals refer to identical or functionally similar elements

DETAILED DESCRIPTION

Figure 1:
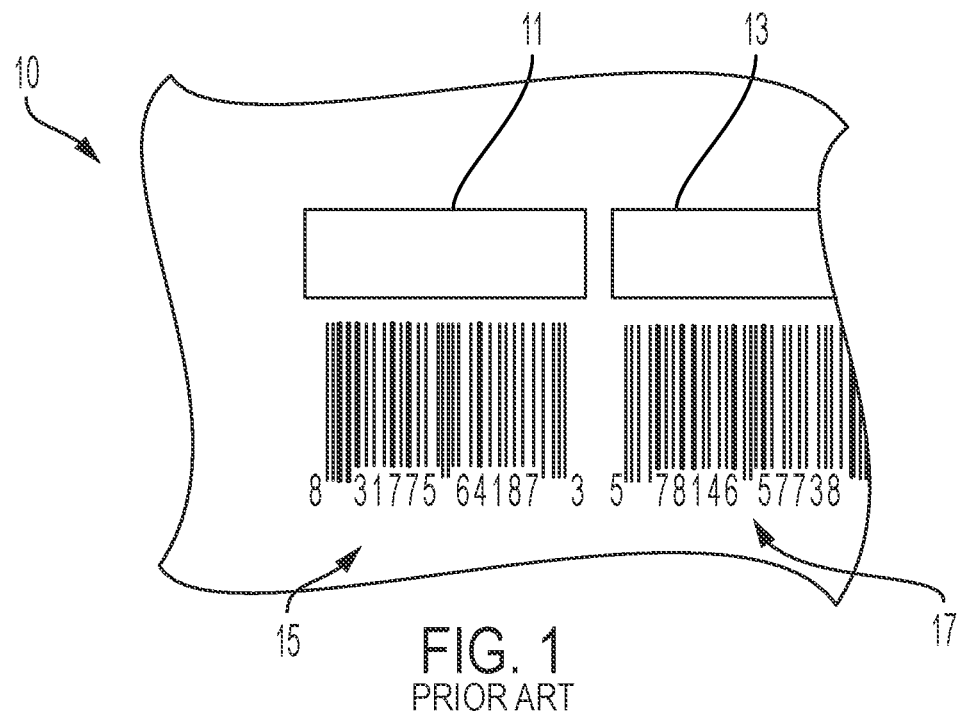
FIG. 1 illustrates a pictorial view of correlation marks located above barcodes and without a decoding key.
Figure 2:
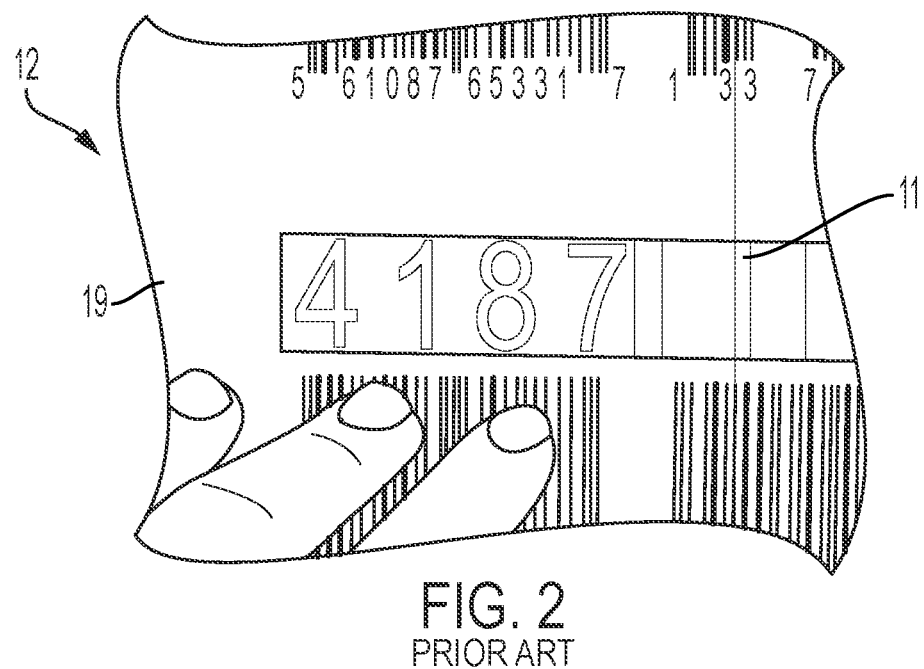
FIG. 2 illustrates a pictorial view of a correlation mark with a decoding key.
Figure 3:
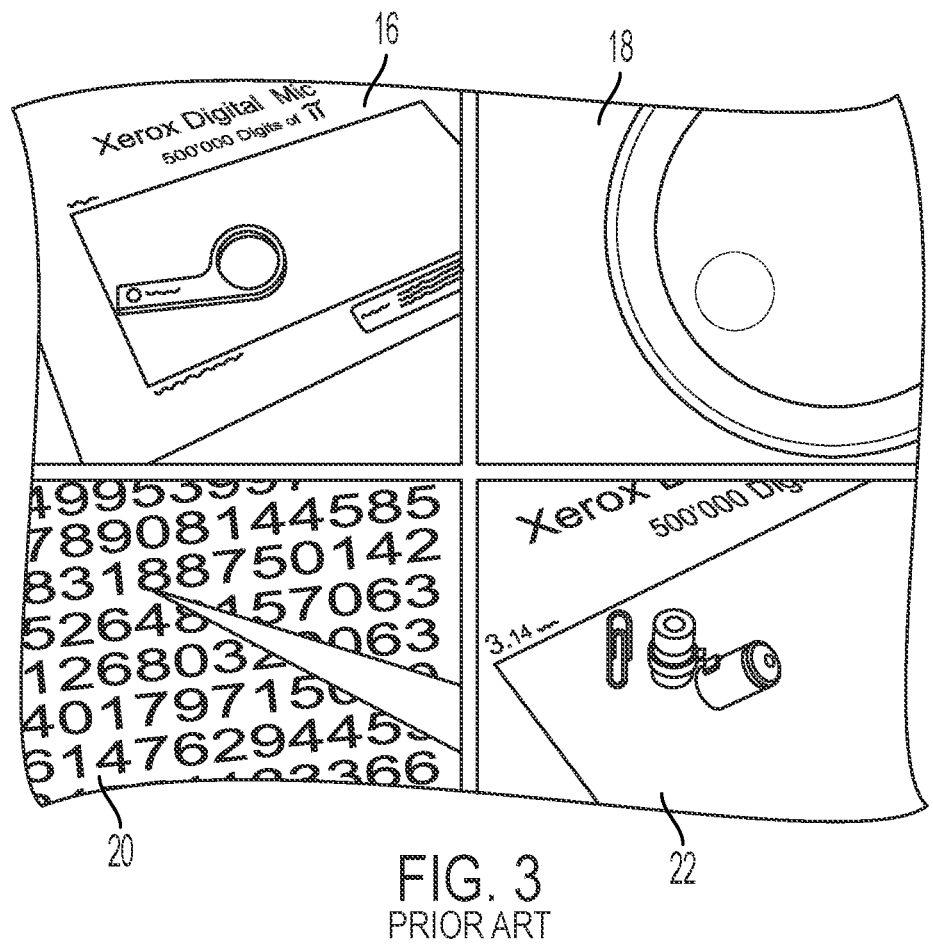
FIG. 3 illustrates pictorial views demonstrating microtext with and without a loupe.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and can refer to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

The term 'correlation mark' as utilized herein can relate to a security mark such as a digital watermark that can be embedded in an image or video using, for example, correlation-based watermarking. The basic idea behind correlation-based watermarking is to embed a watermark in an image or video by modifying the pixel values in a way that is imperceptible to the human eye, but that can be detected using correlation analysis.

A correlation mark is a specific type of watermark that can be embedded using this technique. A correlation mark may include a small, unique pattern that can be embedded in the image or video. When the image or video is analyzed using correlation-based techniques, the pattern can be detected and used to verify the authenticity or ownership of the content.

Correlation marks are often used in applications where it is important to protect the intellectual property of digital content, such as in the entertainment industry or in document management systems. By embedding a correlation mark in a digital image or video, it is possible to prove ownership or detect unauthorized copying or distribution of the content.

The disclosed embodiments relate to a security apparatus such as a security mark based on or including a correlation mark, which can be applied to specialty imaging effects such as microtext. As will be discussed in more detail herein, a first layer variable data microtext cay be defined. This first layer may be referred to as a first variable layer and can be written at a certain angle and frequency. A second layer of variable microtext (referred to as a second variable layer) can also be defined. This second variable layer can be written out of phase or orthogonally from the first variable layer at the same frequency. This can form a third layer of variable data text (i.e., a third variable layer) that is decodable with a correlation mark decoding screen, also referred to as a decoder screen. All three effects can share the same area. A method for creating and rendering the security mark can involve the following steps:

1) Define a Correlation Mark frequency F;
2) Create a microfont with a period less than 1/F;
3) Define a Correlation Mark angle A which will be limited by microtext capabilities;
4) Define variable data strings one, two and three;
5) Write the first string at angle A, at frequency F using the font from step 2—this corresponds to a textbox in an example;
6) Write the second string orthogonal to angle A, at frequency F using the font from step 2—this corresponds to the text in an example.

These steps can be implemented to create the third variable data string that may be decoded. In step 1 we can use the standard CR decoder screen frequency so existing decoders work with this approach. However, some microfonts may be too large. One way to resolve this problem can involve lowering of the frequency F. Instead, a microfont may be modified to change the transformation matrix from glyph space to device space along with setting the device to the highest resolution so the modified font has a period less than 1/F.

For step 3 we again would like the standard CR decoder angle A but microtext degrades at that angle. Thus, a choice of 0, 90, 180, or 270 degrees should be used. Alternatively, for the examples used here, the user space can be rotated by −A degrees allowing the microtext to print at 0 degrees. To use the standard decoder, it also has to be manually rotated by −A degrees.

Steps 5 and 6 can be followed to create the correlation effect out of the two microtext strings. Alternatively in step 6 the second string can be written out of phase with the first string rather than orthogonally. The above methodology is also described in FIG. 7.

Note that the term 'decoder screen' (also referred to as a 'decoding screen') as utilized herein can relate to a visual or digital interface that can allow a user to extract or decipher watermarked information embedded within an image or a video. A decoding screen can provide the necessary tools or algorithms to reveal a hidden watermark. These tools may include image processing filters, mathematical algorithms, or specialized software applications designed to extract the watermark data from the media file. In some cases, the decoding screen may display the original image or video alongside the extracted watermark, allowing the user to compare and analyze the results.

A decoding screen can enable authorized users to retrieve the embedded information from watermarked media. It can also help in verifying the authenticity of the media and ensure that it has not been tampered with. It is important to note that a specific implementation of a decoding screen can vary depending on the watermarking technique used and the software or system employed for the decoding process. Different methods may require different decoding screens or interfaces tailored to their specific algorithms and requirements.

Figure 4:
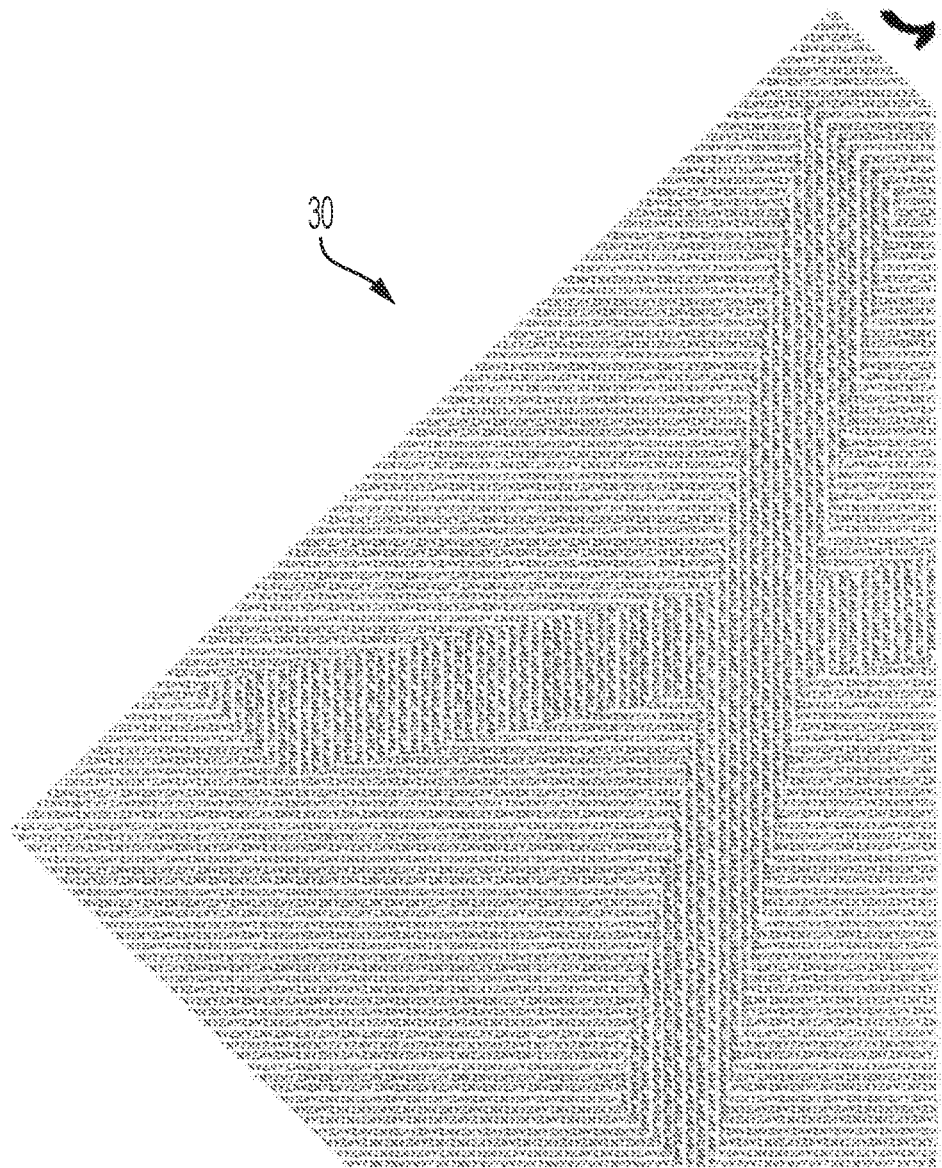
FIG. 4 illustrates an example of a microtext string, in accordance with an embodiment.

FIG. 4 illustrates an example of a microtext string 30, in accordance with an embodiment. FIG. 4 depicts an example of the steps above with one microtext string of "ABC" and the other of "XYZ". The correlation string is "XEROX" although only the X is visible in the zoomed figure.

Figure 5:
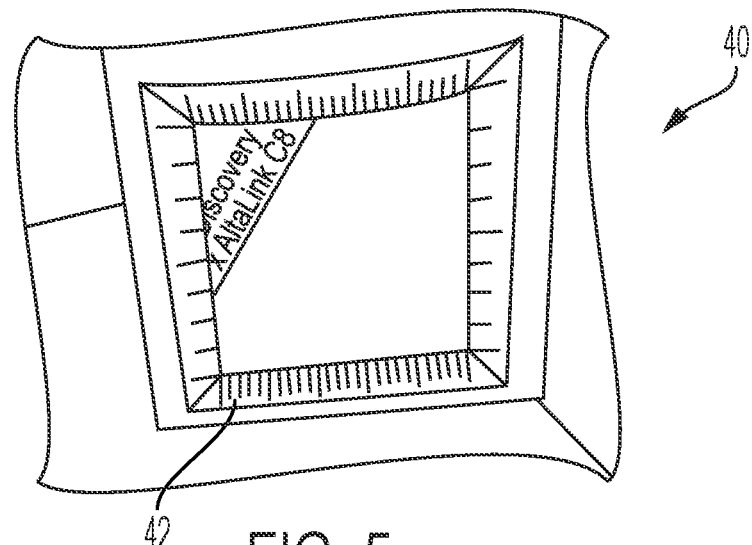
FIG. 5 illustrates a pictorial view taken through a loupe with different strings, in accordance with an embodiment.

FIG. 5 illustrates a pictorial view 40 of an image that can be taken through a loupe with different strings, in accordance with an embodiment. That is, FIG. 5 depicts another example of a picture taken through a loupe with different strings. The view shown in FIG. 5 is contained within a square shaped object 42 in the pictorial view 40.

Figure 6:
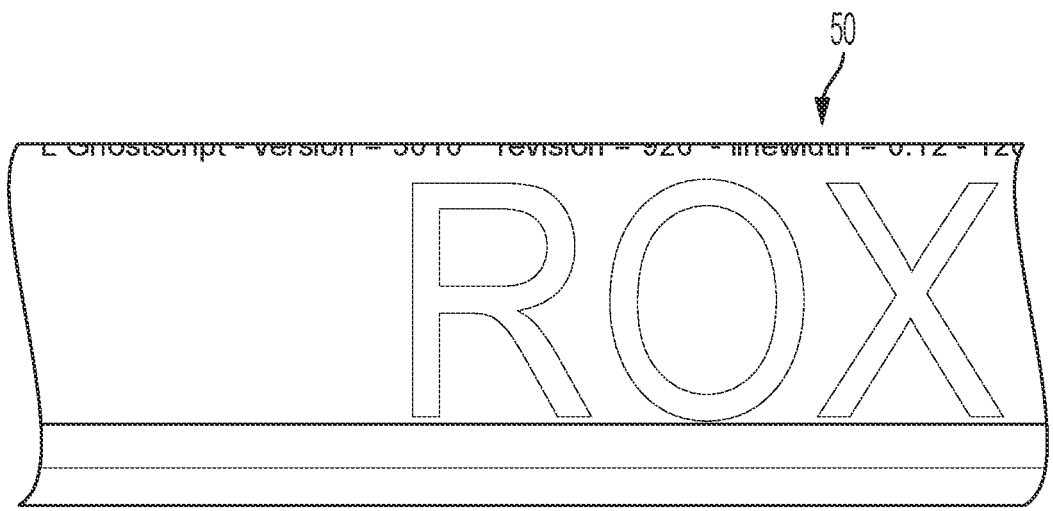
FIG. 6 illustrates a pictorial view subject to a decoding screen instead of a loupe, in accordance with an embodiment.

FIG. 6 illustrates an a pictorial view 50 of an image subject to a decoding screen instead of a loupe, in accordance with an embodiment. FIG. 6. depicts the same picture as FIG. 5 using a decoding screen instead of a loupe. The "XE" in "XEROX were visible but faded out in the picture. While a variable data string was used in this example other objects such as graphics or icons can be used.

Note that the term microtext or micro text as utilized herein can relate to various types of small printed or engraved text that may be difficult to read without the aid of magnification. Microtext can be used in various security documents such as banknotes, passports, identity cards, and other important documents to prevent counterfeiting and tampering. Microtext can be printed or engraved on a document using special techniques that make it difficult to replicate, and it may be used in combination with other security features such as holograms, watermarks, or special inks. In addition to its use in security documents, microtext can also be used in other applications such as miniature labels, technical documentation, and fine art prints.

The term microfont as used herein can relate to a very small font size that can be used in printing or displaying text that needs to be compact or inconspicuous. Microfonts are often used in security documents such as passports, ID cards, and banknotes, where they may be used in conjunction with other security features such as microtext, holograms, and watermarks to prevent counterfeiting and fraud. The use of microfonts can make it difficult for counterfeiters to replicate the text on the document, as it may be too small to read or reproduce accurately.

Figure 7:
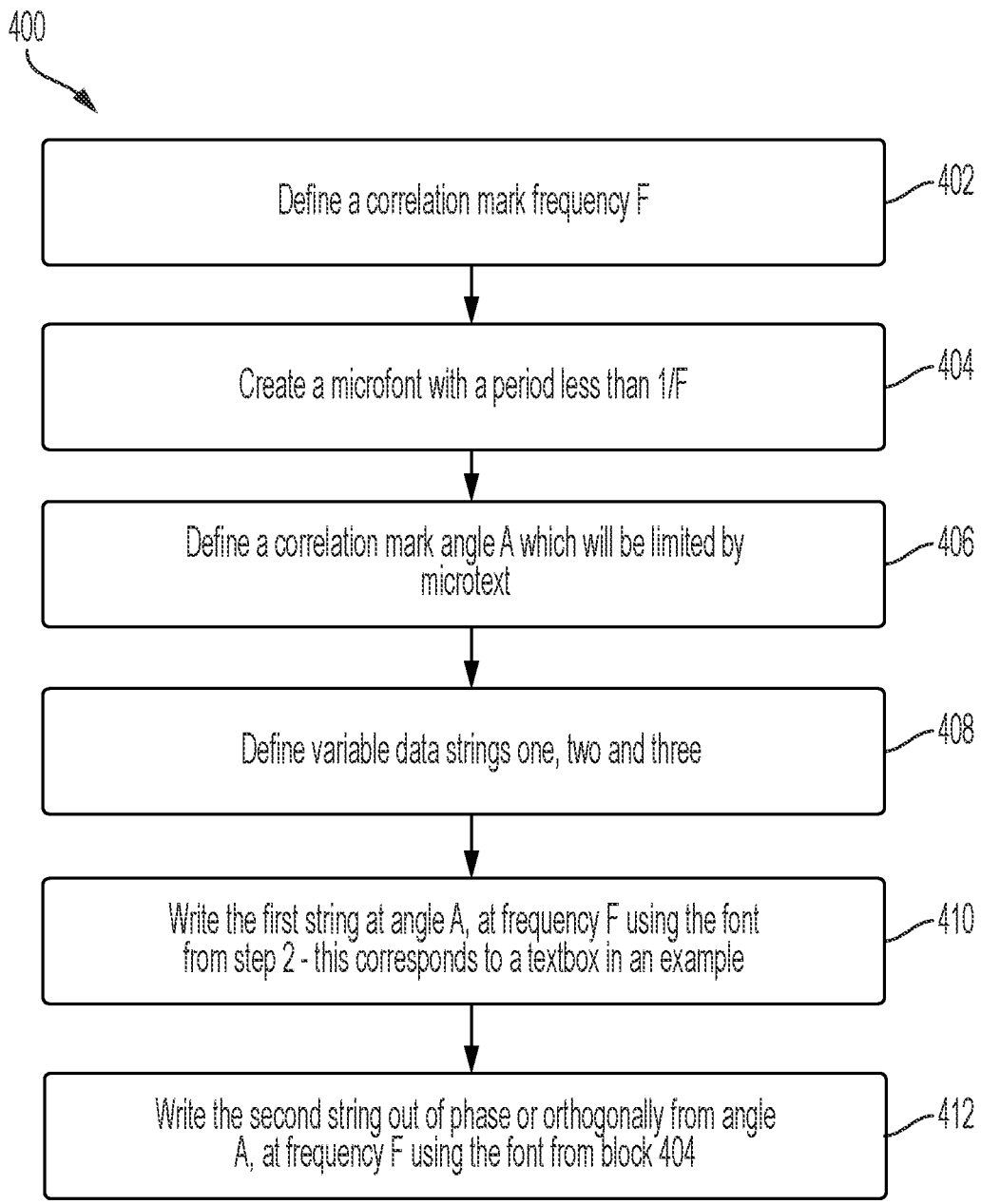
FIG. 7 illustrates a high-level flow chart of operation depicting logical operational steps of a method for rendering a security mark, in accordance with an embodiment.

FIG. 7 illustrates a high-level flow chart of operation depicting logical operational steps of a method 400 for rendering a security mark, in accordance with an embodiment. As shown at block 402, a step or operation can be implemented to define a correlation mark frequency. Next, as depicted at block 404, a step or operation can be implemented to create a microfont with a period less than 1/F. Thereafter, as shown at block 406, a step or operation can be implemented to define a correlation mark angle A, which will be limited by microtext capabilities.

Then, as indicated at block 408, a step or operation can be implemented to define variable data strings one, two and three. Thereafter, as shown at block 410, a step or operation can be implemented to write the first string at angle A, at frequency F using the font from block 404, which corresponds to a textbox in an example. Next, as depicted at block 412, a step or operation can be implemented to write the second string out of phase from or orthogonal to angle A, at frequency F using the font from block—this can correspond to the text (as an example).

For the operation shown at block 406, we again would like the standard CR decoder angle A, but as discussed previously, the microtext degrades at that angle. Therefore, a choice of 0, 90, 180, or 270 degrees should be used. Alternatively, for the examples used here user space can be rotated by −A degrees allowing the microtext to print at 0 degrees. The standard decoder also has to be manually rotated by −A degrees in order to use this decoder.

The operations shown at block 410 and 412 can create the correlation effect out of the two microtext strings. Alternatively, in the operation depicted at block 412, the second string can be written out of phase with the first string rather than orthogonally. Note that some embodiments may be implemented with strings written out of phase or orthogonally from one another. For example, consider microtext strings "ABCDE" and "WXYZ". An orthogonally implementation would be as follows: orthogonal:

ABCDE
W
X
Y
Z

However, an out of phase or placement in the center between variable string 1 at the same frequency would be as follows:

ABCDEABCDE
WXYZWXYZW
ABCDEABCDE

Figure 8:
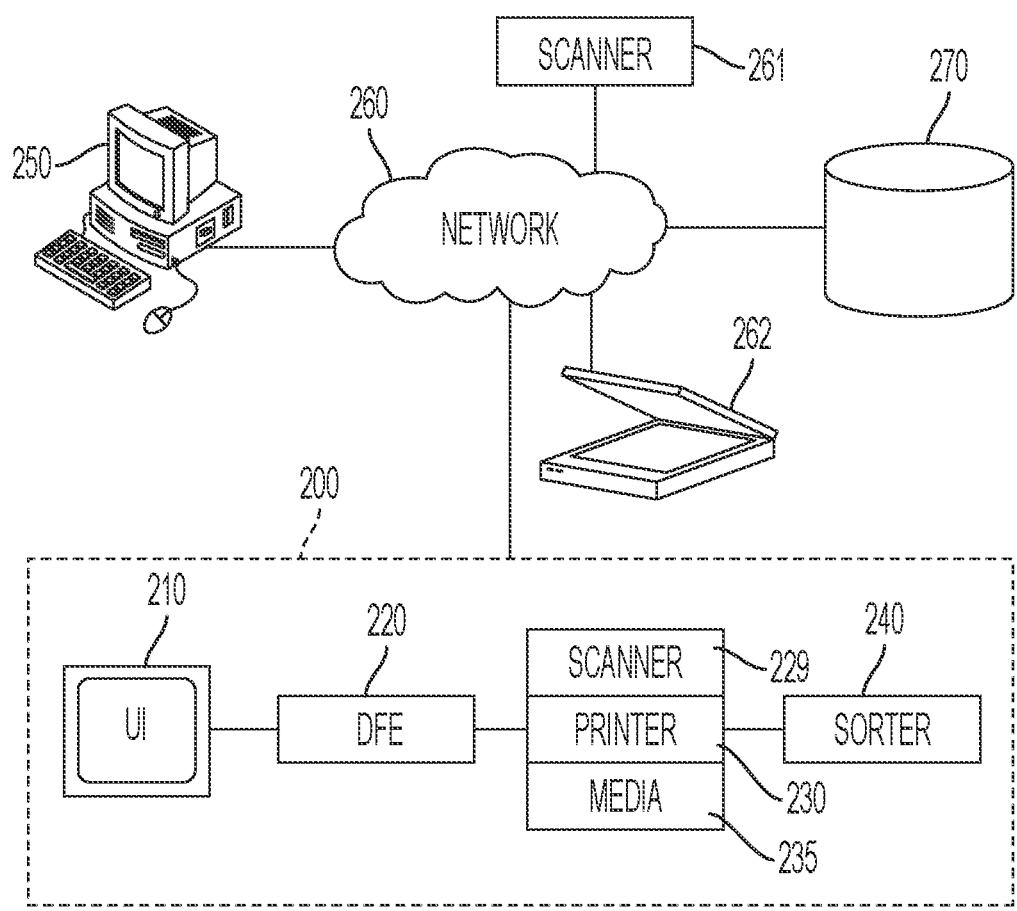
FIG. 8 illustrates a block diagram of a printing system suitable for implementing one or more of the disclosed embodiments.

With reference to FIG. 8, a printing system (or image rendering system) 200 may be suitable for implementing various aspects of the exemplary embodiments described herein is illustrated. In some embodiments, the printing system 200 can implement rendering operations such as scanning a document via a scanner and printing a document via a printer, wherein the document includes the disclosed two-layer correlation mark with a variable data hiding layer.

Figure 9:
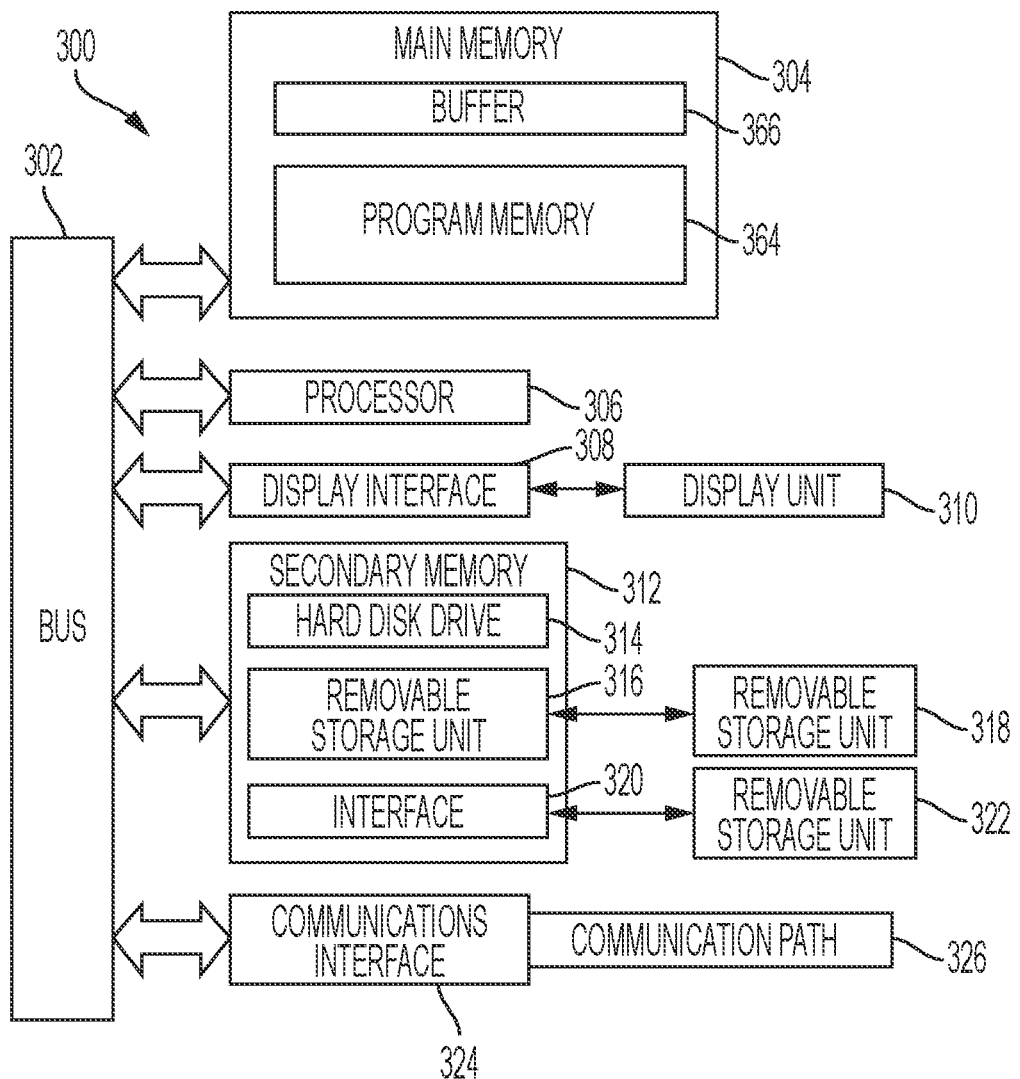
FIG. 9 illustrates a block diagram of a digital front-end useful for implementing one or more of the disclosed embodiments.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. Such a scanner may also be incorporated into, for example, a printing system such as the printing system 200 shown in FIG. 8. For example, the scanner 229 is shown in FIG. 9 as a part of the printing system 200. Alternatively, or in addition to the scanner 229, scanners 261 and 262 also depicted in FIG. 9, may be implemented, which can communicate with the network 260.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 200 can include a user interface 210, a digital front-end (DFE) 220, and at least one print engine 230. The print engine 230 has access to print media 235 of various sizes and cost for a print job. In some embodiments, the printing system 200 can be implemented as a color printer having multiple color marking materials. Note that the DFE 220 may also include or relate to a DFE controller. In other embodiments, the printing system 200 may be implemented as a multi-function device (MFD) that incorporates the functionality of multiple rendering devices in one. An MFD may act as a combination of some or all of the following devices: printer, scanner, photocopier, email, fax, etc.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

The term digital front-end or DFE as utilized herein relates to the part of the printing process that takes a digital file and prepares it for printing. It is essentially the bridge between the computer or other digital device and the printing press or other output device. The DFE is responsible for a number of important tasks, such as color management, raster image processing (RIP), and data transfer to the printing device. The DFE takes the digital file and converts it into a format that is compatible with the printing device, such as a PDF or PostScript file. The DFE also manages the printing process, including job queuing, job prioritization, and error handling. It can also perform advanced functions such as variable data printing, which can allow for personalized printing of each individual piece in a print run.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. In some embodiments, one or more color sensors (not shown) may be embedded in the printer paper path associated with the printer 230.

With respect to FIG. 9, an exemplary DFE 300 is shown in greater detail. The DFE 300 can include one or more processors, such as processor 306 capable of executing machine executable program instructions. The processor 306 can function as a DFE processor and in some embodiments may be used as or with the DFE 220 shown in FIG. 8. Furthermore, DFE 300 shown in FIG. 8 may be used as the DFE 220 of FIG. 8.

In the embodiment shown, the processor 306 can communicate with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., that stores computer software and/or data. The UI 210 shown in FIG. 8 may be displayed as a graphical user interface (GUI) via, for example, the display 310 shown in FIG. 8.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The DFE 300 can include a communications interface 324, which can act as an input and an output to allow software and data to be transferred between the and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions/steps, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 8 and/or the DFE 300 shown in FIG. 9. A "module" can perform the various steps, operations or instructions discussed herein, such as the steps or operations discussed herein such as, for example, the steps, operations or instructions of method 400 of FIG. 7.

The method 400 shown in FIG. 7, for example, may be implemented, in part, in a computer program product comprising a module that may be executed by, for example, DFE 220. The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE 220, via a digital network such as the network 260 shown in FIG. 8).

It is understood that the specific order or hierarchy of steps, operations, or instructions in the processes or methods disclosed is an illustration of exemplary approaches. For example, the various steps, operations or instructions discussed herein can be performed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which the security device (e.g., a watermark) may be rendered.

Based on the foregoing, it can be appreciated that a number of embodiments are disclosed including preferred and alternative embodiments. For example, in an embodiment, a method of rendering a security mark, can involve: providing two variable layers of data text for a security mark including a first variable layer and a second variable layer; and applying the security mark to a recording medium using the two variable layers to create a third variable layer of the security mark, wherein the second variable layer is applied out of phase or orthogonally from the first variable layer at a same frequency, which forms the third variable layer with data text that is decodable.

In an embodiment, the third variable layer with the data text can be decoded with a decoding screen.

In an embodiment, the first, second, and third variable layers can share the same area.

In an embodiment, the security mark can comprise a correlation mark.

In an embodiment, the security mark can comprise a watermark.

In an embodiment, the data text can comprise variable data text.

In an embodiment, the variable data text can comprise micro text.

In an embodiment, a method of rendering a security mark, can involve the following steps: a) defining a security mark with a frequency; b) creating a microfont with a period less than a fraction of the frequency; c) defining the security mark with an angle that is limited by the microfont; d) defining a first variable data string, a second variable data string, and a third variable data string; e) writing the first variable data string at the angle and the frequency using the microfont; f) writing the second variable data string out of phase or orthogonally from the angle and at the frequency using the microfont.

In an embodiment, as a result of implemented the aforementioned steps a) through f), the third variable data string may not be decodable without a decoding screen.

In an embodiment, a security apparatus, can include a security mark having two variable layers of data text including a first variable layer and a second variable layer; and a third variable layer of the security mark, wherein the security mark is applied to a recording medium using the two variable layers to create the third variable layer of the security mark, wherein the second variable layer is applied out of phase from or orthogonal to the first variable layer at a same frequency, which forms the third variable layer with data text that is decodable.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of rendering a security mark, comprising:
   providing two variable layers of data text for a security mark including a first variable layer and a second variable layer; and
   applying the security mark to a recording medium using the two variable layers to create a third variable layer of the security mark, wherein the second variable layer is applied out of phase or orthogonally from the first variable layer at a same frequency, which forms the third variable layer with data text that is decodable, wherein the third variable layer with the data text is decodable with a decoding screen.

2. The method of claim 1 wherein the security mark comprises a correlation mark comprising a watermark.

3. The method of claim 1 wherein the first, second, and third variable layers share a same area.

4. The method of claim 1 wherein the security mark comprises a correlation mark.

5. The method of claim 1 wherein the security mark comprises a watermark.

6. The method of claim 1 wherein the data text comprises variable data text.

7. The method of claim 6 wherein the variable data text comprises micro text.

8. A method of rendering a security mark, comprising the following steps:
   a) defining a security mark with a frequency;
   b) creating a microfont with a period less than a fraction of the frequency;
   c) defining the security mark with an angle that is limited by the microfont;
   d) defining a first variable data string, a second variable data string, and a third variable data string;
   e) writing the first variable data string at the angle and the frequency using the microfont;
   f) writing the second variable data string out of phase or orthogonally from the angle and at the frequency using the microfont.

9. The method of claim 8 wherein as a result of steps a) through f), the third variable data string is not decodable without a decoding screen.

10. The method of claim 8 wherein the security mark comprises a correlation mark.

11. The method of claim 8 wherein the security mark comprises a watermark.

12. A security apparatus, comprising:
   a security mark having two variable layers of data text including a first variable layer and a second variable layer; and
   a third variable layer of the security mark, wherein the security mark is applied to a recording medium using the two variable layers to create the third variable layer of the security mark, wherein the second variable layer is applied out of phase from or orthogonal to the first variable layer at a same frequency, which forms the third variable layer with data text that is decodable, wherein the third variable layer with the data text is decodable with a decoding screen.

13. The security apparatus of claim 12 wherein the security mark comprises a correlation mark comprising a watermark.

14. The security apparatus of claim 12 wherein the first, second, and third variable layers share a same area.

15. The security apparatus of claim 12 wherein the security mark comprises a correlation mark.

16. The security apparatus of claim 12 wherein the security mark comprises a watermark.

17. The security apparatus of claim 12 wherein the data text comprises variable data text.

18. The security apparatus of claim 17 wherein the variable data text comprises micro text.

19. The security apparatus of claim 12 wherein the third variable layer with the data text is decodable with a decoding screen, and the first, second, and third variable layers share a same area.

20. The security apparatus of claim 19 wherein the security mark comprises a correlation mark and the data text comprises variable data text.

\* \* \* \* \*